US010550978B2

(12) United States Patent
Kawahara et al.

(10) Patent No.: US 10,550,978 B2
(45) Date of Patent: Feb. 4, 2020

(54) JOINING STRUCTURE AND JOINING METHOD THEREOF

(71) Applicant: NSK LTD., Shinagawa-ku, Tokyo (JP)

(72) Inventors: Hiroshi Kawahara, Kanagawa (JP); Sumio Sugita, Kanagawa (JP)

(73) Assignee: NSK LTD., Tokyo (JP)

( * ) Notice: Subject to any disclaimer, the term of this patent is extended or adjusted under 35 U.S.C. 154(b) by 657 days.

(21) Appl. No.: 14/782,697

(22) PCT Filed: Dec. 19, 2013

(86) PCT No.: PCT/JP2013/007482
§ 371 (c)(1),
(2) Date: Oct. 6, 2015

(87) PCT Pub. No.: WO2014/167614
PCT Pub. Date: Oct. 16, 2014

(65) Prior Publication Data
US 2016/0047501 A1    Feb. 18, 2016

(30) Foreign Application Priority Data

Apr. 9, 2013  (JP) ................ 2013-081470

(51) Int. Cl.
*F16L 33/00* (2006.01)
*F16L 33/207* (2006.01)
*F16L 13/14* (2006.01)

(52) U.S. Cl.
CPC ......... *F16L 33/2076* (2013.01); *F16L 13/146* (2013.01)

(58) Field of Classification Search
CPC .................... F16L 13/141; F16L 33/2076
See application file for complete search history.

(56) References Cited

U.S. PATENT DOCUMENTS 1,797,691 A    3/1931   Merrill
3,590,464 A    7/1971   Wildi et al.
(Continued)

FOREIGN PATENT DOCUMENTS

CN    101213395 A    7/2008
CN    201434163 Y    3/2010
(Continued)

OTHER PUBLICATIONS

Japanese-language Office Action issued in counterpart Japanese Application No. 2015-510961 dated Jul. 4, 2017 with English translation (Five (5) pages).
European Office Action issued in counterpart European Application No. 13 881 542.8 dated Nov. 3, 2017 (seven pages).
(Continued)

*Primary Examiner* — David Bochna
*Assistant Examiner* — James A Linford
(74) *Attorney, Agent, or Firm* — Crowell & Moring LLP

(57) ABSTRACT

Provided are: a joining structure capable of suitably obtaining joining strength between components which compose the joining structure; and a joining method thereof. For this purpose, a joining structure (1) includes: a shaft member (10); and a thin-walled cylindrical member (20) that fits an inner circumferential surface thereof to an outer circumferential surface of the shaft member (10). The thin-walled cylindrical member (20) has: a first crimped portion (21), in which an axially intermediate portion is reduced in diameter in a radial direction, and is crimped to the shaft member (10); and a second crimped portion (22), in which an end surface (20a) is folded radially inward, and is crimped to the shaft member (10).

8 Claims, 9 Drawing Sheets

(56) References Cited

U.S. PATENT DOCUMENTS

| | | | |
|---|---|---|---|
| 3,642,311 | A | 2/1972 | Edgemond, Jr. |
| 3,792,603 | A | 2/1974 | Orain |
| 2008/0197624 | A1 | 8/2008 | Nakano et al. |

FOREIGN PATENT DOCUMENTS

| | | | | |
|---|---|---|---|---|
| DE | 20 2004 016 655 U1 | 1/2005 | | |
| EP | 1 691 124 A2 | 8/2006 | | |
| FR | 911587 A | * 7/1946 | ......... | F16L 33/2076 |
| JP | 59-100174 U | 7/1984 | | |
| JP | 59-212134 A | 12/1984 | | |
| JP | 9-189382 A | 7/1997 | | |
| JP | 10-314870 A | 12/1998 | | |
| JP | 11-325360 A | 11/1999 | | |
| JP | 2001-269740 A | 10/2001 | | |
| WO | WO-2006087745 A1 | * 8/2006 | ............ | B62D 5/062 |

OTHER PUBLICATIONS

European Search Report issued in counterpart European Application No. 13881542.8 dated Oct. 20, 2016 (eight pages).

International Search Report (PCT/ISA/210) issued in PCT Application No. PCT/JP2013/007482 dated Mar. 25, 2014 with English translation (Two (2) pages).

International Preliminary Report on Patentability (PCT/IB/338 & PCT/IB/373) issued in PCT Application No. PCT/JP2013/007482 dated Oct. 13, 2015, including English translation of document C2 (Japanese-language Written Opinion (PCT/ISA/237)) previously filed on Oct. 6, 2015 (Six (6) pages).

Indian Examination Report issued in Indian counterpart application No. 2887/MUMNP/2015 dated Nov. 6, 2018 (Nine (9) pages).

Brazilian Office Action issued in Brazilian counterpart application No. BR112015025604-0 dated Jul. 9, 2019, with English translation (Nine (9) pages).

* cited by examiner

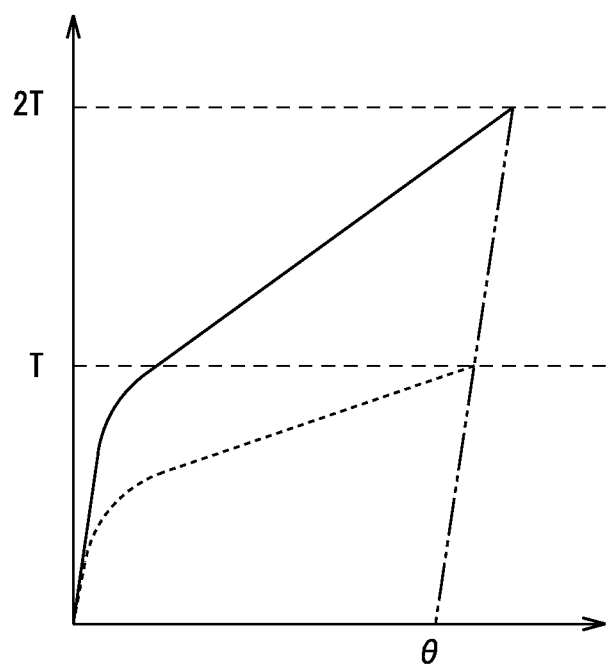
FIG. 12
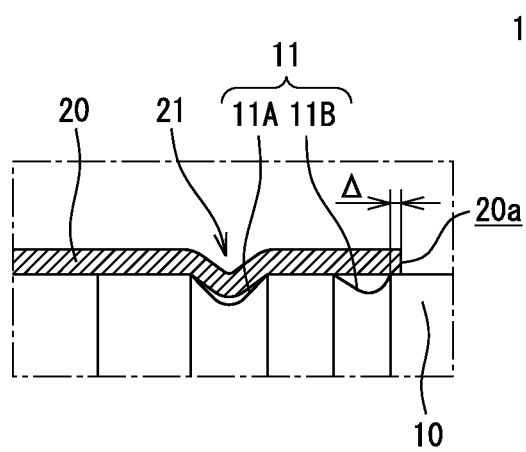 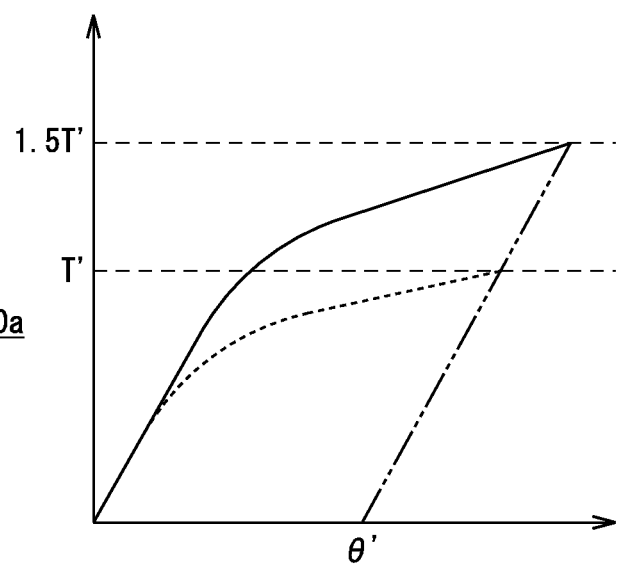
FIG. 13A FIG. 13B

JOINING STRUCTURE AND JOINING METHOD THEREOF

TECHNICAL FIELD

The present invention relates to a joining structure and a joining method thereof, and particularly, relates to a joining structure formed by crimping joint of a shaft member and a thin-walled cylindrical member, and to a joining method thereof.

BACKGROUND ART

Heretofore, a pipe joint described in Patent Literature 1 has been mentioned as a joining structure, which fits a thin-walled cylindrical member to a shaft member such as a solid shaft or a hollow shaft, crimps the thin-walled cylindrical member to then fix the thin-walled cylindrical member to the shaft member.

As shown in FIG. 14, in the pipe joint of Patent Literature 1, a connecting pipe 103 (thin-walled cylindrical member) is fitted to an outer circumference of a second pipe 102 (shaft member) fitted to an outer circumference of a first pipe 101. Then, a plurality of spots in an axial length direction of the connecting pipe 103 is crimped at crimped portions 104a and 104b.

In the connecting pipe 103, a wall thereof is gradually thinned from one end thereof to other end thereof, and a crimp ratio of the crimped portion 104a on a thin-wall side is set smaller than a crimp ratio of the crimped portion 104b on a thick-wall side. As a result, the second pipe 102 is prevented from falling out by the crimped portion 104b having a larger crimp ratio. Meanwhile, cutoff of the second pipe 102, which is caused by a tensile stress, is prevented by the crimped portion 104a having a smaller crimp ratio.

CITATION LIST

Patent Literature

PTL 1: JP H11-325360 A

SUMMARY OF INVENTION

Technical Problem

However, in the joining structure described in Patent Literature 1, it has been extremely difficult to ensure joining strength in a rotation direction (circumferential direction) of the shaft member and the thin-walled cylindrical member.

For example, in a case of reducing a diameter of the thin-walled cylindrical member and crimp-joining the thin-walled cylindrical member to the shaft member, both thereof are joined to each other by frictional force of contact surfaces of both thereof. However, in such a joined state, since springback of the thin-walled cylindrical member has been present, it has been difficult to appropriately control a contact surface pressure between the thin-walled cylindrical member and the shaft member, and it has been difficult to ensure the joining strength.

In particular, in a case where the shaft member and the thin-walled cylindrical member are made of raw materials such as steel and aluminum, which are different from each other, then in the joining of these shaft member and thin-walled cylindrical member, it is conceived that looseness occurs due to a linear expansion coefficient difference between the two members depending on an atmospheric temperature.

Moreover, there is also a method of fixing the rotation direction by providing the shaft member side with a groove parallel to the axial direction and crimping the thin-walled cylindrical member to the groove; however, also in this method, a gap sometimes occurs between the groove and the thin-walled cylindrical member due to the springback of the thin-walled cylindrical member. As a result, a backlash in the rotation direction has sometimes occurred in the joining of the shaft member and the thin-walled cylindrical member.

In this connection, the present invention has been made by focusing on the problem mentioned above, and it is an object of the present invention to provide a joining structure capable of suitably obtaining the joining strength of the members which compose the joining structure, and to provide a joining method thereof.

Solution to Problem

A certain embodiment of a joining structure for achieving the above-described object includes: a shaft member; and a thin-walled cylindrical member that fits an inner circumferential surface thereof to an outer circumferential surface of the shaft member, wherein the thin-walled cylindrical member has: a first crimped portion, in which an axially intermediate portion is reduced in diameter in a radial direction, and is crimped along a first V-shaped groove provided on the circumferential surface of the shaft member; and a second crimped portion, in which an end surface is folded radially inward, and is crimped along a second V-shaped groove provided on the circumferential surface of the shaft member.

Here, in the above-described joining structure, the second V-shaped groove may form a cross-sectional shape asymmetric in the axial direction, in which a raise angle on an end portion side receiving the thin-walled cylindrical member may be larger than a raise angle on an opposite side to the end portion.

Moreover, in the above-described joining structure, the second crimped portion may be formed only on a part in a circumferential direction of the end surface of thin-walled cylindrical member, or the second crimped portions may be formed at an equal interval.

Furthermore, in the above-described joining structure, a material of the shaft member and a material of the thin-walled cylindrical member may be different metals each other.

Moreover, in the above-described joining structure, it is preferable that a lap margin of the second V-shaped groove and the thin-walled cylindrical member be equal to or less than a thickness of the thin-walled cylindrical member.

Moreover, a certain embodiment of a joining method of a joining structure, which fits a shaft member and a thin-walled cylindrical member to each other so that an outer circumferential surface of the shaft member and an inner circumferential surface of the thin-walled cylindrical member can abut against each other, includes:

a first crimped portion forming step of forming a first crimped portion by reducing an axially intermediate portion of the thin-walled cylindrical member in a radial direction, the first crimped portion being crimped along a first V-shaped groove provided on a circumferential surface of the shaft member; and a second crimped portion forming step of forming a second crimped portion by folding an end surface of the thin-walled cylindrical member radially inward in a state where the thin-walled cylindrical member covers a second V-shaped groove, the second crimped portion being crimped along a second V-shaped groove provided on the circumferential surface of the shaft member.

Here, in the above-described joining method of a joining structure, the second crimped portion may be formed only on a part in a circumferential direction of the end surface of thin-walled cylindrical member, or the second crimped portions may be formed at an equal interval.

Advantageous Effects of Invention

In accordance with the present invention, there can be provided: the joining structure capable of suitably obtaining the joining strength of the members which compose the joining structure; and the joining method thereof.

BRIEF DESCRIPTION OF DRAWINGS

FIG. 6A is a view showing the state before the second crimped portion forming step; FIG. 6B is a view showing a state of the second crimped portion forming step; and FIG. 6C is a view showing a state after the second crimped portion forming step;

FIG. 7A is a view showing the state before the second crimped portion forming step; and FIG. 7B is a view showing the state after the second crimped portion forming step;

FIG. 8A is a view showing a state before the second crimped portion forming step in a mode where a thin-walled cylindrical member does not cover a second V-shaped groove; and FIG. 8B is a view showing the state after the second crimped portion forming step;

FIG. 11A shows a case where a raise angle of a first V-shaped groove is 45°; and FIG. 11B shows a case where the raise angle of the first V-shaped groove is 60° and 30°;

FIG. 12 is a graph showing joining strength in a rotation direction of a shaft member and the thin-walled cylindrical member, in which a relative torque between the shaft member and the thin-walled cylindrical member is shown on a vertical axis, and a relative angle between the shaft member and the thin-walled cylindrical member is shown on a horizontal axis;

FIG. 13A is a partial cross-sectional view showing a positional relationship between the second V-shaped groove and the thin-walled cylindrical member at a time of joining the same; and FIG. 13B is a graph showing joining strength in the rotation direction of the shaft member and the thin-walled cylindrical member.

DESCRIPTION OF EMBODIMENTS

A description is made below of embodiments of a joining structure according to the present invention and a joining method thereof with reference to the drawings.
(Joining Structure)

Figure 1:
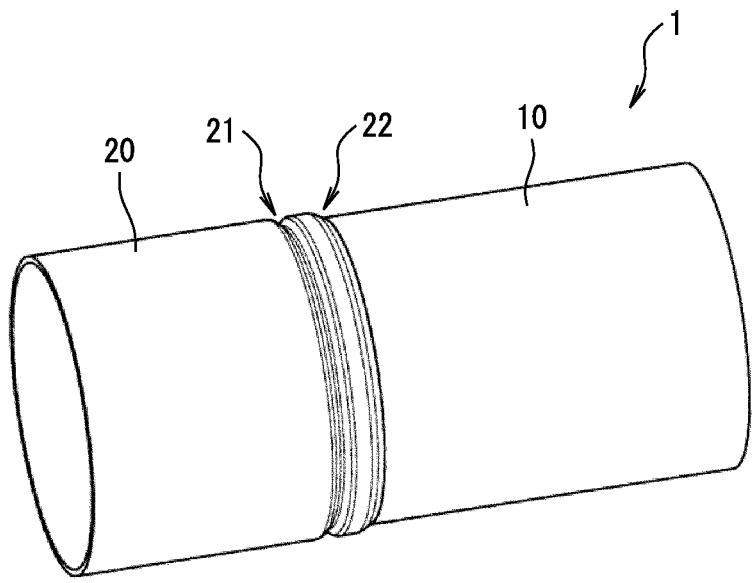
FIG. 1 is a perspective view showing a configuration in a certain embodiment of a joining structure.
Figure 2:
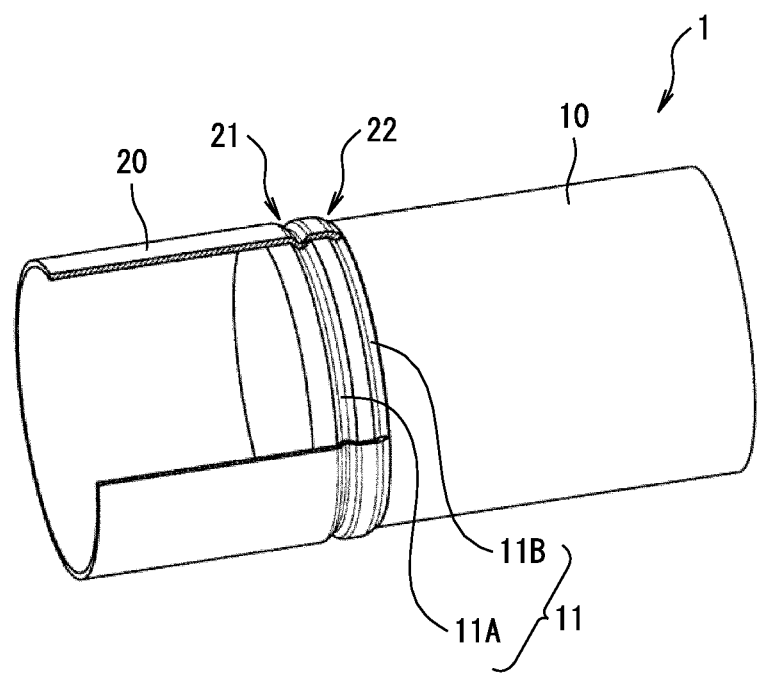
FIG. 2 is a partial cross-sectional view showing the configuration in the certain embodiment of the joining structure.

FIG. 1 is a perspective view showing a configuration in a certain embodiment of a joining structure according to the present invention. Moreover, FIG. 2 is a partial cross-sectional view showing the configuration in the certain embodiment of the joining structure according to the present invention. Furthermore, FIG. 3 is a partial cross-sectional view of a main portion, showing the configuration in the certain embodiment of the joining structure according to the present invention.

Figure 3:
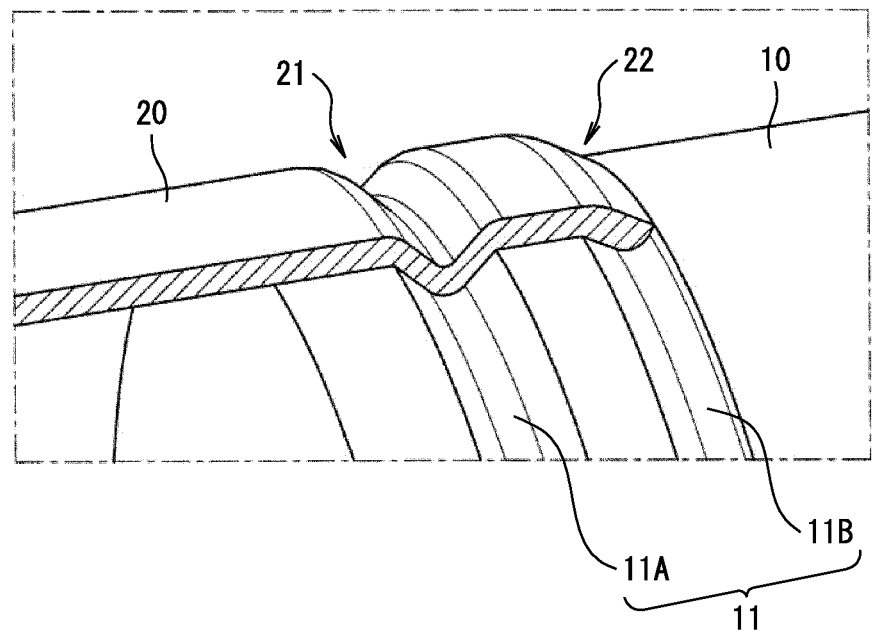
FIG. 3 is a partial cross-sectional view of a main portion, showing the configuration in the certain embodiment of the joining structure.

As shown in FIG. 1 to FIG. 3, a joining structure 1 of this embodiment includes: a shaft member 10; and a thin-walled cylindrical member 20 that fits an inner circumferential surface thereof to an outer circumferential surface of the shaft member 10.

In the shaft member 10, a plurality of V-shaped grooves 11 is provided in an axial direction around an entire circumferential surface thereof. These V-shaped grooves 11 are provided, for example, in order of a first V-shaped groove 11A and a second V-shaped groove 11B from an end portion of the shaft member 10, which receives the thin-walled cylindrical member 20.

The thin-walled cylindrical member 20 includes: a first crimped portion 21, in which an axially intermediate portion is reduced in diameter in a radial direction, and is crimped along the first V-shaped groove 11A of the shaft member 10; and a second crimped portion 22, in which an end surface 20a is folded radially inward, and is crimped along the second V-shaped groove 11B of the shaft member 10. In this embodiment, each of the first crimped portion 21 and the second crimped portion 22 is provided around the entire circumferential surface of the thin-walled cylindrical member 20. Note that processing for the first crimped portion is not limited to processing by mechanical crimping, and the first crimped portion just needs to be a constriction portion, which is formed by a diameter reduction method by electromagnetic force, and the like, and roughly goes along the first V-shaped groove.

Figure 7A:
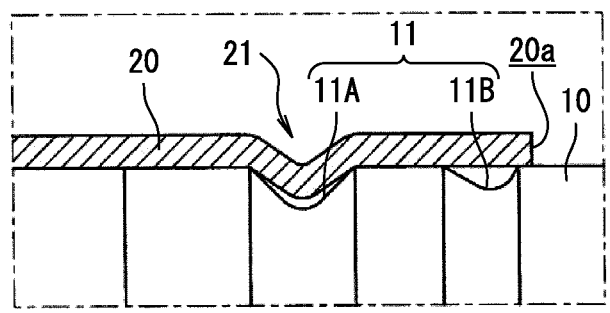
FIGS. 7A and 7B are partial cross-sectional views showing a joining method by a second crimped portion in the certain embodiment of the joining method of the joining structure.
Figure 7B:
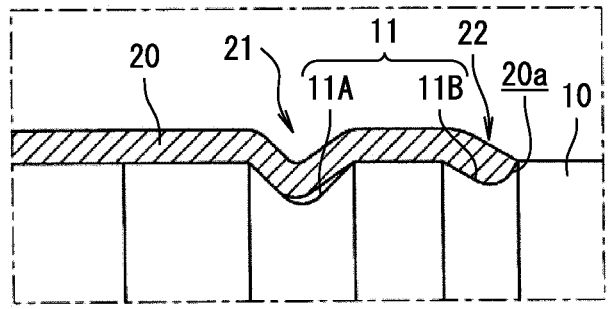

Moreover, preferably, the second V-shaped groove 11B forms a cross-sectional shape asymmetric in the axial direction, in which a raise angle of an end side that receives the thin-walled cylindrical member 20 is set larger than a raise angle of an opposite side to the above-described end portion (refer to FIGS. 7A and 7B).

(Joining Method of Joining Structure)

Next, a description is made of a joining method of the joining structure shown in FIGS. 1 to 3.

Figure 4:
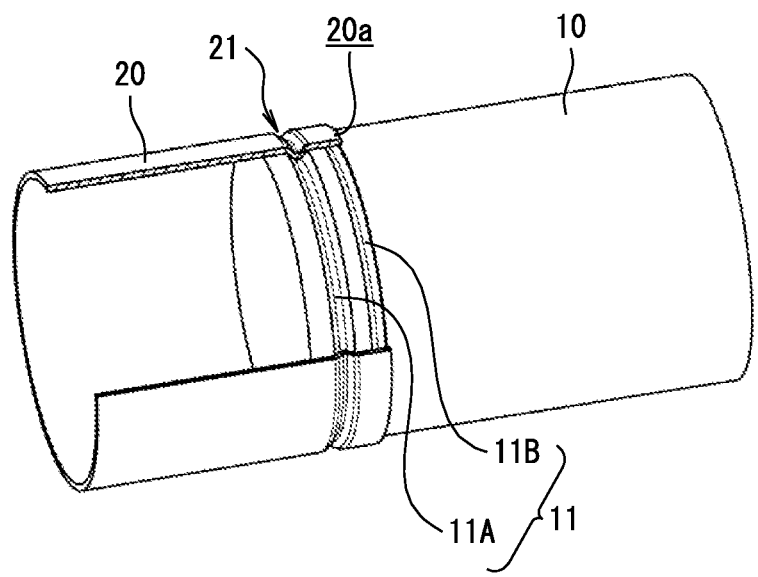
FIG. 4 is a partial cross-sectional view showing a state before a second crimped portion forming step in a certain embodiment of a joining method of the joining structure.
Figure 5:
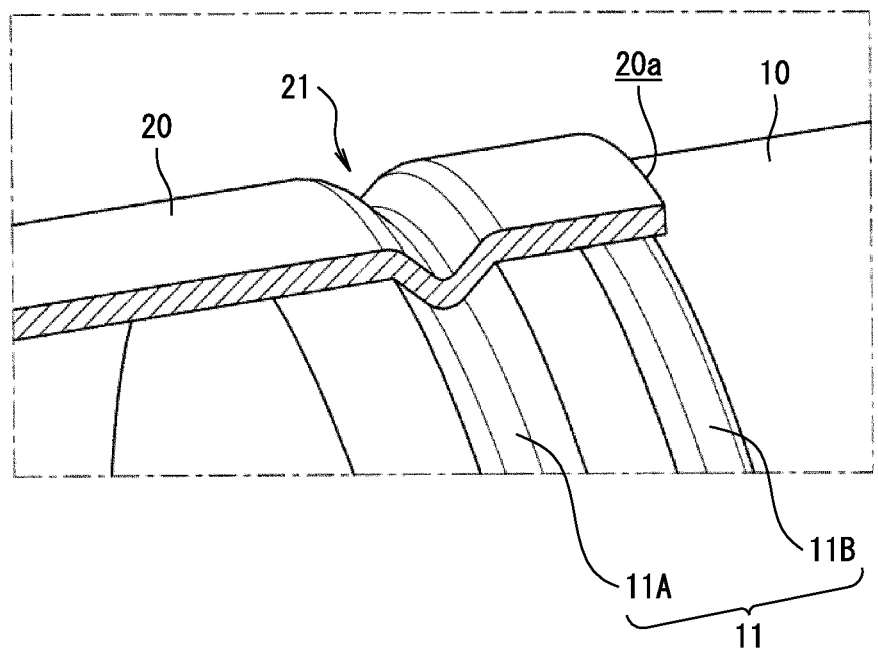
FIG. 5 is a partial cross-sectional view of the main portion, showing the state before the second crimped portion forming step in the certain embodiment of the joining method of the joining structure.

FIG. 4 is a partial cross-sectional view showing a state before a second crimped portion forming step in the certain embodiment of the joining method of the joining structure. Moreover, FIG. 5 is a partial cross-sectional view of the main portion, showing a state before the second crimped portion forming step in the certain embodiment of the joining method of the joining structure.

Figure 6A:
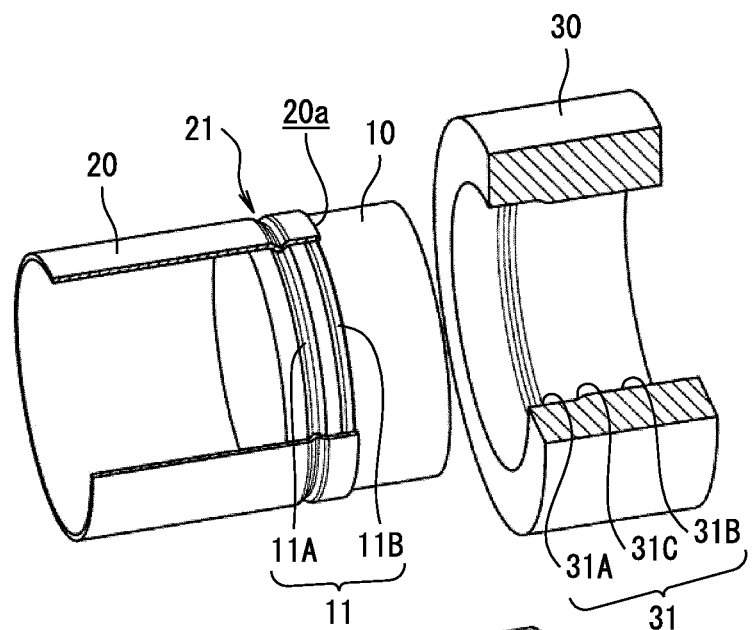
FIGS. 6A to 6C are views showing steps in the certain embodiment of the joining method of the joining structure.
Figure 6B:
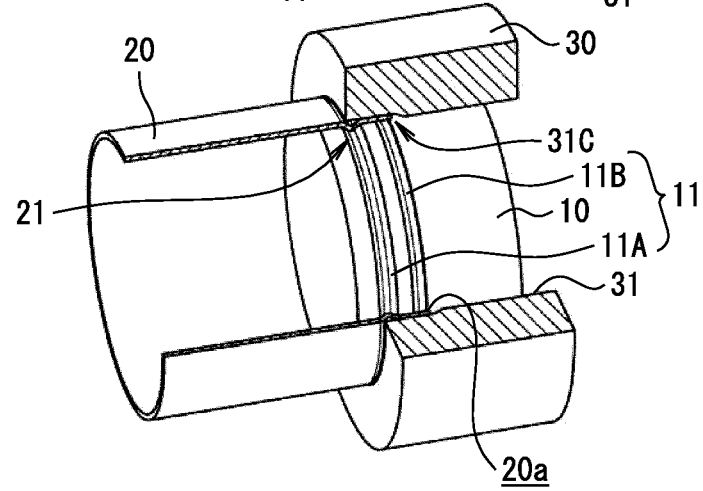
Figure 6C:
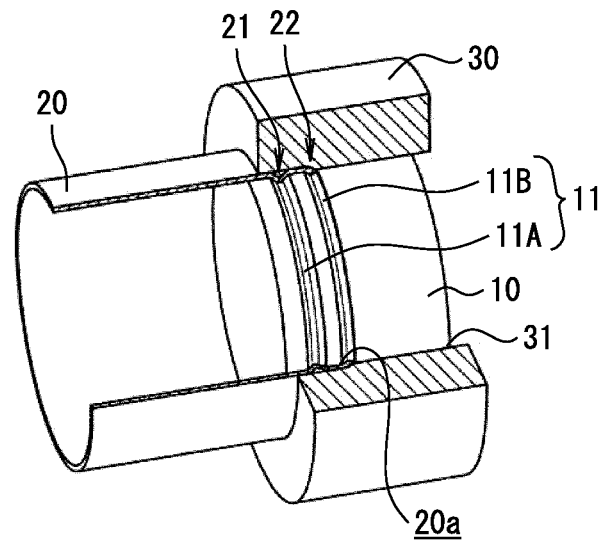

Moreover FIGS. 6A to 6C are views showing steps in the certain embodiment of the joining method of the joining structure: FIG. 6A is a view showing the state before the second crimped portion forming step; FIG. 6B is a view showing a state of the second crimped portion forming step; and FIG. 6C is a view showing a state after the second crimped portion forming step. Furthermore, FIGS. 7A and 7B are partial cross-sectional views showing a joining method by a second crimped portion in the certain embodiment of the joining method of the joining structure: FIG. 7A is a view showing the state before the second crimped portion forming step; and FIG. 7B is a view showing the state after the second crimped portion forming step.

The joining method of the joining structure of this embodiment includes a first crimped portion forming step and the second crimped portion forming step after fitting the shaft member 10 and the thin-walled cylindrical member 20 so that the outer circumferential surface of the shaft member 10 and the inner circumferential surface of the thin-walled cylindrical member 20 can abut against each other.

<First Crimped Portion Forming Step>

As shown in FIG. 4, the first crimped portion forming step is a step of forming the first crimped portion 21 by reducing the diameter of the axially intermediate portion of the thin-walled cylindrical member 20 fitted to the shaft member 10 and crimping the intermediate portion along the first V-shaped groove 11A of the shaft member 10.

<Second Crimped Portion Forming Step>

Moreover, as shown in FIG. 5, the second crimped portion forming step is a step of forming the second crimped portion 22 by folding the end surface 20a of the thin-walled cylindrical member 20 radially inward of the thin-walled cylindrical member 20 and crimping the end surface 20a along the second V-shaped groove 11B of the shaft member 10 in a state where the thin-walled cylindrical member 20 covers the second V-shaped groove 11B.

Here, in the second crimped portion forming step, as shown in FIG. 5, the thin-walled cylindrical member 20 before folding the end surface 20a radially inward is fitted to the outer circumference of the shaft member 10 to a range of completely covering the first V-shaped groove 11A provided on the shaft member 10, and from this state, is folded following compression. In such a way, a stress in a compression direction remains between the first crimped portion 21 and the second crimped portion 22.

Moreover, the second crimped portion forming step is performed by using a die 30 as shown in FIGS. 6A to 6C. The die 30 is a member that forms an annular shape, in which an inner circumferential surface 31 is composed by including: a large-diameter portion 31A having an inner diameter substantially equal to an outer diameter of the thin-walled cylindrical member 20; a small-diameter portion 31B having an inner diameter substantially equal to an inner diameter of the thin-walled cylindrical member 20a; and a tapered surface 31C that connects these to each other. Note that the large-diameter portion 31A, the small-diameter portion 31B, the tapered surface 31C and connection portions thereamong are composed of a smooth curved surface.

In the second crimped portion forming step, first, as shown in FIG. 6A, for the shaft member 10 and the thin-walled cylindrical member 20 after the first crimped portion forming step, an axial direction of the die 30 and the axial direction of the shaft member 10 and the thin-walled cylindrical member 20 are matched with each other, and the die 30 is set.

Next, as shown in FIG. 6B, in order that the large-diameter portion 31A can abut against the outer circumferential surface of the thin-walled cylindrical member 20, and that the small-diameter portion 31B can abut against the outer circumferential surface of the shaft member 10, the die 30 is fitted to the shaft member 10 and the thin-walled cylindrical member 20, and the shaft member 10 and the thin-walled cylindrical member 20 are inserted through the die 30 until the end portion 20a is caught by the tapered surface 31C.

Next, as shown in FIG. 6C, from a state where the end portion 20a is caught by the tapered surface 31C, the die 30 is pushed onto the thin-walled cylindrical member 20 in an orientation from the second V-shaped groove 11B of the shaft member 10 toward the first V-shaped groove 11A thereof, and the end surface 20a of the thin-walled cylindrical member 20 is folded radially inward (inside of the second V-shaped groove 11B).

Here, a description is made in detail of functions in an event of folding the end surface 20a of the thin-walled cylindrical member 20 radially inward (inside of the second V-shaped groove 11B). FIG. 7A shows a state before the end surface 20a of the thin-walled cylindrical member 20 is folded radially inward of the thin-walled cylindrical member 20 in a state where the thin-walled cylindrical member 20 covers the second V-shaped groove 22. Moreover, FIG. 7B shows a state after the end surface 20a is folded radially inward of the thin-walled cylindrical member 20. As shown in FIG. 7A, in the state before the end surface 20a is folded radially inward of the thin-walled cylindrical member 20, the first crimped portion 21, which is reduced in diameter and crimped, floats off from the first V-shaped groove 11A by springback. In this state, a contact surface pressure between the first V-shaped groove 11A and the first crimped portion 21 of the thin-walled cylindrical member 20 is low, and joining force generated thereby becomes small.

Accordingly, in this embodiment, as shown in FIG. 7B, the end surface 20a of the thin-walled cylindrical member 20 is folded radially inward (inside of the second V-shaped groove 11B) while being compressed, whereby such a one-side side surface of the first crimped portion 21, which has floated off by the springback, is tightly brought into surface contact with aside surface of the first V-shaped groove 11A, and turns to a state of ensuring the contact surface together with the second crimped portion 22.

At this time, as mentioned above, the thin-walled cylindrical member 20 is folded while being compressed, whereby a suitable surface pressure is generated on each of the contact surfaces, thus making it possible to obtain the joining strength.

Moreover, a description is made below of a reason why it is preferable that the thin-walled cylindrical member 20 be in the state of covering the second V-shaped groove 11B in the event of folding the end surface 20a radially inward of the thin-walled cylindrical member 20.

Figure 8A:
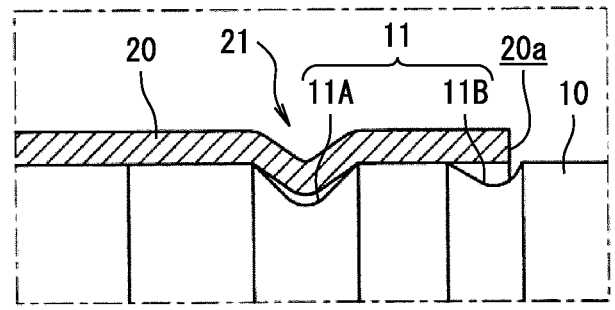
FIGS. 8A and 8B are partial cross-sectional views showing the joining method by the second crimped portion in the joining method of the joining structure.
Figure 8B:
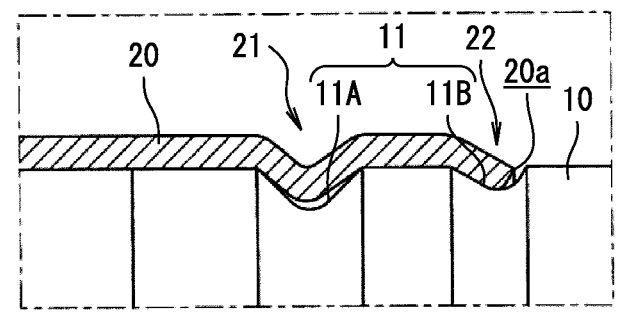

FIGS. 8A and 8B are partial cross-sectional views showing the joining method by the second crimped portion in the joining method of the joining structure: FIG. 8A is a view showing a state before the second crimped portion forming step in a mode where the thin-walled cylindrical member does not cover the second V-shaped groove; and FIG. 8B is a view showing the state after the second crimped portion forming step.

As shown in FIGS. 8A and 8B, when the end portion 20a is folded from a state where the thin-walled cylindrical member 20 does not completely cover the second V-shaped groove 11B to allow partial exposure of the second V-shaped groove 11B, then the stress in the compression direction does not remain between the first crimped portion 21 and the second crimped portion 22, and the first crimped portion 21 is also left in the state of floating off by the springback. That is to say, in such a state, it is apprehended that the contact surface between the shaft member 10 and the thin-walled cylindrical member 20 may not be suitably ensured, resulting in an occurrence of a decrease and dispersion of the joining strength.

(Other Embodiments)

Figure 9:
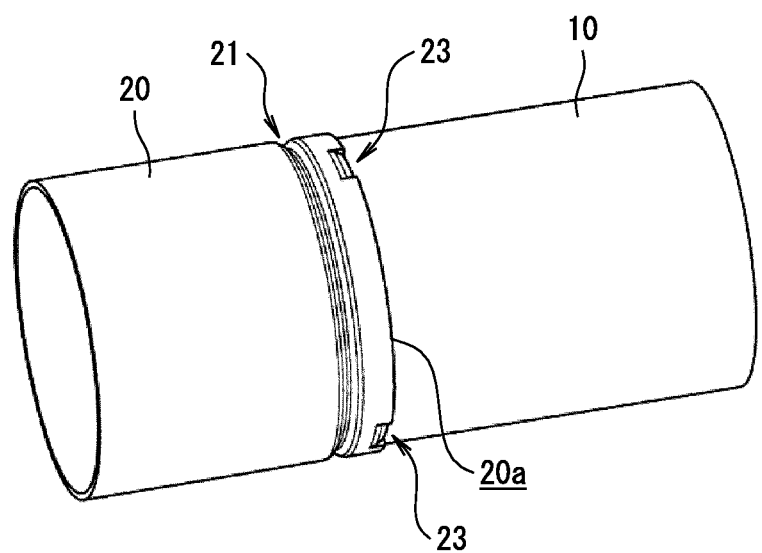
FIG. 9 is a perspective view showing a configuration in another embodiment of the joining structure.
Figure 10:
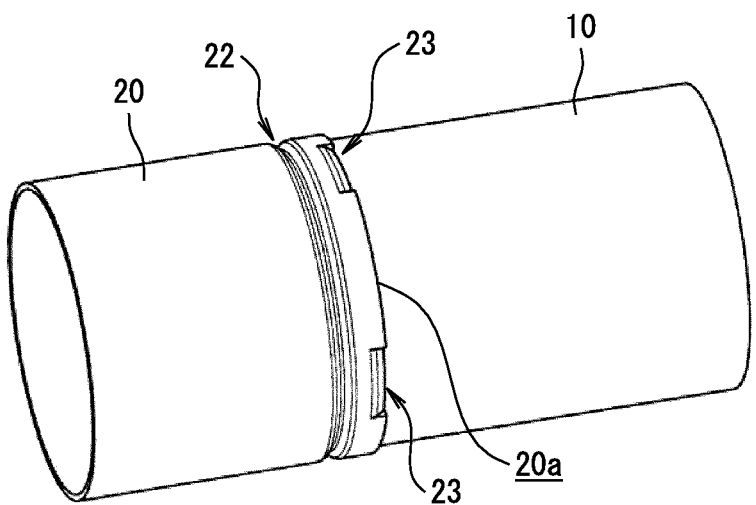
FIG. 10 is a perspective view showing the configuration in the other embodiment of the joining structure.
Figure 11A:
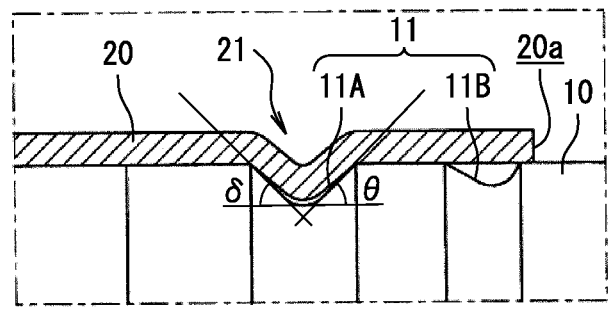
FIGS. 11A and 11B are partial cross-sectional views showing a configuration of a first crimped portion in the other embodiment of the joining structure.
Figure 11B:
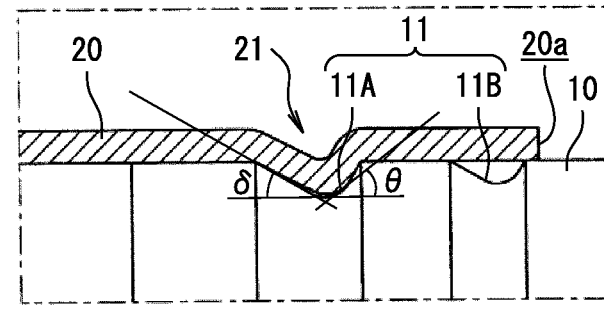
Figure 14:
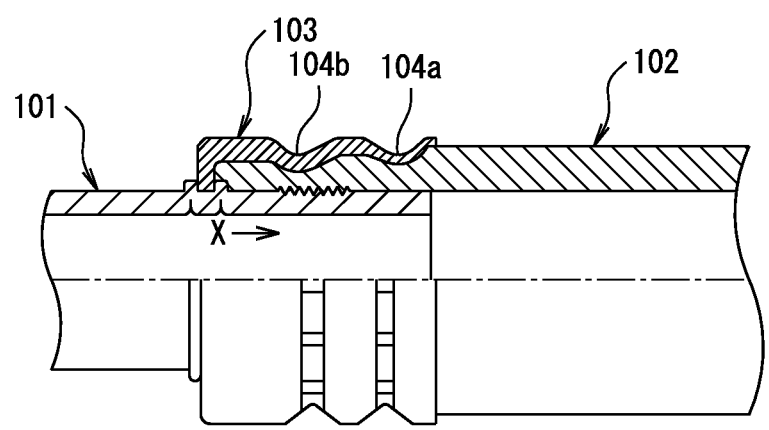
FIG. 14 is a partial cross-sectional view showing a configuration of a conventional joining structure.

FIG. 9 and FIG. 10 are perspective views showing configurations in other embodiments of the joining structure. Moreover, FIGS. 11A and 11B are partial cross-sectional views showing configurations of the first crimped portion in the other embodiments of the joining structure: FIG. 11A shows a case where a raise angle of the first V-shaped groove is 45°; and FIG. 11B shows a case where a raise angle of the first V-shaped groove is 60° and 30°. Note that, in the description of this embodiment, a description of a duplicate configuration with that of the above-mentioned embodiment is omitted.

As shown in FIG. 9 and FIG. 10, in this embodiment, second crimped portions 23 are formed not on an entire circumference of the end surface 20a of the thin-walled cylindrical member 20 but only on a part in a circumferential direction of the end surface 20a. It is preferable that the second crimped portions 23 in such a mode be formed at an equal interval in the circumferential direction of the thin-walled cylindrical member 20.

For example, as shown in FIG. 9, a circumferential width dimension of one second crimped portion 22 may be set at approximately 5% of a dimension of an entire circumference of the thin-walled cylindrical member 20, and such second crimped portions 23 thus formed may be formed at an equal interval on three spots in the circumference direction of the thin-walled cylindrical member 20. Moreover, as shown in FIG. 10, the circumferential width dimension of one second crimped portion 23 may be set at approximately 8% of the dimension of the entire circumference of the thin-walled cylindrical member 20, and such second crimped portions 23 thus formed may be formed at an equal interval on four spots in the circumference direction of the thin-walled cylindrical member 20.

Here, in a case where the second crimped portion 22 is formed on the entire circumference of the end surface 20a of the thin-walled cylindrical member 20 as in the above-mentioned embodiment (refer to FIG. 1), the stress that remains between the first crimped portion 21 and the second crimped portion 22 sometimes becomes excessive depending on structure of the joining structure 1. Such an excessive stress in the inside of the thin-walled cylindrical member 20 causes creep under an environment of a high temperature.

Moreover, in a case where a material of the shaft member 10 and a material of the thin-walled cylindrical member 20 are different from each other, repeated strain amplitude sometimes occurs in the thin-walled cylindrical member 20 due to a thermal expansion difference between the shaft member 10 and the thin-walled cylindrical member 20. Therefore, it is necessary to control the stress between the first crimped portion 21 and the second crimped portion 22 (23) to be constant. It is also possible to control the above-described stress by controlling a compression amount of the thin-walled cylindrical member 20 (that is, an engagement margin of a shoulder portion of the second V-shaped groove 11B and the end surface 20a of the thin-walled cylindrical member 20); however, in this case, it is necessary to strictly control the above-described engagement margin, and a tremendous load is required for controlling tolerances of the respective components.

Accordingly, in this embodiment, the plurality of second crimped portions 23 is partially formed on the end surface 20a, and even in the joining structure 1 having such a configuration, appropriate joining strength can be obtained by adjusting the stress caused by the second crimped portions 23. Moreover, the second crimped portions 23 are partially formed, whereby such compression force generated between the first V-shaped groove 11A and the second V-shaped groove 11B can be prevented from becoming excessive even if the above-described engagement margin becomes large.

Moreover, in this embodiment, as shown in FIGS. 11A and 11B, a cross-sectional shape of the first V-shaped groove 11A, which goes along the axial direction, is made asymmetric in a similar way to the second V-shaped groove 11B, whereby the joining strength of the joining structure 1 may be controlled. For example, as shown in FIG. 11A, the cross-sectional shape of the first V-shaped groove 11A, which goes along the axial direction, usually has raise angles (45°) symmetric in the axial direction. In contrast, as shown in FIG. 11B, the cross-sectional shape of the first V-shaped groove 11A, which goes along the axial direction, may be formed as a cross-sectional shape asymmetric in the axial direction, and a raise angle θ on the end portion 20a side that receives the thin-walled cylindrical member 20 may be larger than a raise angle δ on an opposite side to the end portion 20a. For example, these raise angles θ and δ are 60° and 30°, respectively.

Here, a depth dimension of the first V-shaped groove 11A is substantially equal to a thickness of the thin-walled cylindrical member 20 no matter which the cross-sectional shape in the axial direction may be a symmetric shape or an asymmetric shape.

Meanwhile, a depth dimension of the second V-shaped groove 11B is set smaller than the thickness of the thin-walled cylindrical member 20. This is in order to sufficiently press-fit the thin-walled cylindrical member 20 into the second V-shaped groove 11B in an event of forming the second crimped portion 22 by using the die 30 (refer to FIG. 6) as mentioned above, and when the depth dimension of the second V-shaped groove 11B is larger than the thickness of the thin-walled cylindrical member 20, a gap is generated between the second V-shaped groove 11B and the thin-walled cylindrical member 20, whereby it sometimes becomes difficult to obtain the joining strength of the joining structure 1.

As shown in FIGS. 11A and 11B, the cross-sectional shape of the first V-shaped groove 11A, which goes along the axial direction, is formed symmetric in the axial direction (that is, a groove side surface is formed into a tapered shape), whereby a contact area between a side surface of the first V-shaped groove 11A and the shaft member 10 can be largely ensured. Moreover, as shown in FIG. 11B, when the raise angle δ on the opposite side to the end portion 20a is reduced, the suitable joining strength can be obtained by a wedge effect.

Moreover, the above-described embodiment may be used for a torque sensor that detects torque generated in a rotation shaft. As such a torque sensor, a torque sensor having such a configuration as below is mentioned (for example, refer to JP H11-248562 A). That is to say, the above-described torque sensor includes: a first rotation shaft and a second rotation shaft, which are disposed coaxially with each other, and are coupled to each other through a torsion bar; and a cylindrical member, which is made of a conductive and non-magnetic material, and is integrated with the second rotation shaft in a rotation direction so as to surround an outer circumferential surface of the first rotation shaft.

Moreover, a surrounded portion of the first rotation shaft, which is surrounded by at least the cylindrical member, is formed of a magnetic material, and a groove extended in the axial direction is formed on the surrounded portion. Furthermore, in the cylindrical member, a window is formed so that an overlapping state thereof with the groove can change in response to a relative rotation position thereof to the first rotation shaft. Then, the torque is detected based on an inductance of a coil disposed so as to surround a portion of the cylindrical member, in which the window is formed.

In the torque sensor having such a configuration, there has been room for consideration of the matter that holding force of the cylindrical member for the rotation shafts is varied due to a temperature, and a rotation direction position and axial position of the cylindrical member with respect to the rotation shafts are shifted as a result that the holding force decreases, cause a decrease of detection accuracy.

Accordingly, the joining structure of the present invention and the joining structure thereof are employed for the torque sensor having the above-described configuration, whereby a torque sensor can be provided, which can prevent the decrease of the detection accuracy, can perform high-accuracy torque detection with a simple structure, and in addition, can achieve miniaturization of the device.

FIG. 12 is a graph showing the joining strength in the rotation direction of the shaft member 10 and the thin-walled cylindrical member 20, in which a relative torque between the shaft member 10 and the thin-walled cylindrical member 20 is shown on a vertical axis, and a relative angle between the shaft member 10 and the thin-walled cylindrical member 20 is shown on a horizontal axis.

Note that, in FIG. 12, a broken line shows an evaluation result when the thin-walled cylindrical member 20 is reduced in diameter and crimped to the V-shaped grooves 11 provided on the shaft member 10. Moreover, a solid line in FIG. 12 shows an evaluation result of the joining structure 1 of the embodiment shown in FIGS. 8A and 8B.

Here, the joining structure taken as an evaluation target is one in which the aluminum-made thin-walled cylindrical member 20 with a plate thickness of less than 1 mm is joined to the steel-made shaft member 10 with an outer diameter of φ27 mm. Moreover, this evaluation is a result of applying torque to the joined portions (first crimped portion 21 and second crimped portion 22) until a relative torsion angle after removing the torque reaches a prescribed amount.

As shown in FIG. 12, there was obtained a result that a difference of approximately two times occurred in the applied torque until the relative torsion angle reached θ depending on whether the end portion of the thin-walled cylindrical member 20 was folded. That is to say, in accordance with the joining structure of this embodiment, it becomes possible to enhance reliability of the joined portion.

FIG. 13A is a partial cross-sectional view showing positional relationships between the V-shaped grooves 11 (first V-shaped groove 11A and second V-shaped groove 11B) and the thin-walled cylindrical member 20 in a similar way to FIGS. 7A and 7B and FIGS. 8A and 8B. Moreover, FIG. 13B is a graph showing the joining strength in the rotation direction of the shaft member and the thin-walled cylindrical member. Specifically, FIG. 13B is a graph showing the joining strength in the rotation direction of the shaft member 10 and the thin-walled cylindrical member 20, in which the relative torque between the shaft member 10 and the thin-walled cylindrical member 20 is shown on a horizontal axis, and the relative angle between the shaft member 10 and the thin-walled cylindrical member 20 is shown on a horizontal axis.

In FIG. 13A, a broken line shows an evaluation result of the joining structure 1 in which a lap margin (engagement margin) Δ of the shoulder portion of the second V-shaped groove 11B and the end surface 20a of the thin-walled cylindrical member 20 is folded from a state of "Δ=t/5 (t is a thickness of the thin-walled cylindrical member 20)". Moreover, a solid line in FIG. 13 shows an evaluation result of the joining structure 1 in which the lap margin Δ is folded from a state equivalent to that of the thickness t of the thin-walled cylindrical member 20.

As shown in FIG. 13, it is confirmed that the joining structure having a larger lap margin tends to obtain higher joining strength. This is derived from a difference in stress generated between the second crimped portion 22 and the second V-shaped groove 11B, and illustrates that the joining strength can be adjusted within a predetermined range by adjusting the lap margin.

Note that, when the above-described lap margin is folded from a state of being set at a fixed amount or more, such a malfunction sometimes occurs that the thin-walled cylindrical member 20 is buckled before being folded toward the inside of the second V-shaped groove 11B, the load applied to the first crimped portion 21 becomes excessive, and desired holding force cannot be obtained. Based on this fact, it is preferable that the above-described lap margin be set at the wall thickness t of the thin-walled cylindrical member 20 or less.

As described above, in accordance with the certain embodiment of the present invention, when the shaft member 10 and the thin-walled cylindrical member 20 are crimp-joined to each other, the first crimped portion 21 is provided in the intermediate portion of the thin-walled cylindrical member 20, and in addition, the second crimped portion 22 obtained by folding the end surface 20a of the thin-walled cylindrical member 20 radially inward is provided therein.

Then, the formation of the second crimped portion 22 is performed while compressing the thin-walled cylindrical member 20, whereby the stress in the compression direction remains in the inside of the thin-walled cylindrical member 20 (that is, between the first crimped portion 21 and the second crimped portion 22), and as reaction force thereof, the surface pressure is generated on the contact surface between the shaft member 10 and the thin-walled cylindrical member 20.

By this contact surface pressure, suitable frictional force is generated between the shaft member 10 and the thin-walled cylindrical member 20, and the joining strength in the rotation direction can be obtained.

Moreover, even in the case where the material of the shaft member 10 and the material of the thin-walled cylindrical member 20 are different from each other, for example, even in the case where the materials are steel and aluminum, respectively, then in accordance with this embodiment, the stress in the compression direction remains between the first crimped portion 21 and the second crimped portion 22. Accordingly, if an expansion difference remains within a fixed range even if the expansion difference occurs due to the change of the atmospheric temperature, then complete loosening of the crimp joining of the thin-walled cylindrical member 20 to the shaft member 10 is extremely rare.

As above, the description has been made of the joining structure and the joining method thereof; however, the joining structure according to the present invention and the joining method thereof are not limited to the above-described embodiments, and are modifiable in various ways without departing from the spirit of the present invention. For example, detailed conditions such as the shape of the V-shaped grooves, the shape of the second crimped portion and the number of the second crimped portions are alterable within a range where the functions of the present invention are exerted.

REFERENCE SIGNS LIST

1 JOINING STRUCTURE
10 SHAFT MEMBER
11A FIRST V-SHAPED GROOVE
11B SECOND V-SHAPED GROOVE
20 THIN-WALLED CYLINDRICAL MEMBER
20a END PORTION
21 FIRST CRIMPED PORTION
22 SECOND CRIMPED PORTION
23 SECOND CRIMPED PORTION

The invention claimed is:

1. A joining structure comprising:
a shaft member; and
a cylindrical member configured to fit an inner circumferential surface of the cylindrical member to an outer circumferential surface of the shaft member,
wherein the cylindrical member includes: a first crimped portion, in which an axially intermediate portion is reduced in diameter in a radial direction, and is crimped along a first V-shaped groove provided on the outer circumferential surface of the shaft member; and a second crimped portion, in which an end surface is folded radially inward, and is crimped along a second V-shaped groove provided on the outer circumferential surface of the shaft member;
wherein the second V-shaped groove has a cross-sectional shape asymmetric in the axial direction, in which a raise angle on an end portion side receiving the cylindrical member is larger than a raise angle on an opposite side to the end portion;
wherein the end surface of the cylindrical member is folded radially inward to completely cover the second V-shaped groove;
wherein a one-side side surface of the first crimped portion that is floated off from the first V-shaped groove is brought into surface contact with a side surface of the first V-shaped groove, and forming a void between the first crimped portion and the first V-shaped groove that extends from the one-side side surface down to the bottom of the first V-shaped groove then from the bottom of the first V-shaped groove up a side surface of the first V-shaped groove opposite the one-side side surface, in a final state.

2. The joining structure according to claim 1, wherein second crimped portions are formed only on a part in a circumferential direction of the end surface of the cylindrical member.

3. The joining structure according to claim 2, wherein the second crimped portions are formed at an equal interval in the circumferential direction of the end surface of the cylindrical member.

4. The joining structure according to claim 1, wherein a material of the shaft member and a material of the cylindrical member are made of different metals from each other.

5. The joining structure according to claim 1, wherein a lap margin of the second V-shaped groove and the cylindrical member is equal to or less than a thickness of the cylindrical member.

6. A joining method of a joining structure, which fits a shaft member and a cylindrical member to each other so that an outer circumferential surface of the shaft member and an inner circumferential surface of the cylindrical member can abut against each other, the joining method comprising:
a first crimped portion forming step of forming a first crimped portion by reducing an axially intermediate portion of the cylindrical member in a radial direction, the first crimped portion being crimped along a first V-shaped groove provided on a circumferential surface of the shaft member; and
a second crimped portion forming step of forming a second crimped portion by folding an end surface of the cylindrical member radially inward by pushing the end surface of the cylindrical member in an orientation from a second V-shaped groove of the shaft member toward the first V-shaped groove of the shaft member such that a one-side side surface of the first crimped portion is brought into contact with a side surface of the first V-shaped groove, the one-side side surface being floated off from the first V-shaped groove by springback, to completely cover the second V-shaped groove in a state where the cylindrical member covers the second V-shaped groove, the second crimped portion being crimped along the second V-shaped groove provided on the circumferential surface of the shaft member, and forming a void between the first crimped portion and the first V-shaped groove that extends from the one-side side surface down to the bottom of the first V-shaped groove then from the bottom of the first V-shaped groove up a side surface of the first V-shaped groove opposite the one-side side surface, in a final state.

7. The joining method of a joining structure according to claim 6, wherein the second crimped portion forming step forms second crimped portions only on a part in a circumferential direction of the end surface of the cylindrical member.

8. The joining method of a joining structure according to claim 7, wherein the second crimped portion forming step forms the second crimped portions at an equal interval in the circumferential direction of the end surface of the cylindrical member.

* * * * *